US012506295B2

(12) United States Patent
Cook

(10) Patent No.: US 12,506,295 B2
(45) Date of Patent: Dec. 23, 2025

(54) WATERTIGHT ELECTRICAL BACKSHELL FOR SEALING ELECTRICAL CONNECTORS IN AN UNDERGROUND UTILITY METER BOX

(71) Applicant: Nicor, Inc., Dripping Springs, TX (US)

(72) Inventor: Jeffrey A. Cook, Dripping Springs, TX (US)

(73) Assignee: Nicor, Inc., Dripping Springs, TX (US)

( * ) Notice: Subject to any disclaimer, the term of this patent is extended or adjusted under 35 U.S.C. 154(b) by 313 days.

(21) Appl. No.: 18/202,861

(22) Filed: May 26, 2023

(65) Prior Publication Data

US 2023/0396015 A1 Dec. 7, 2023

Related U.S. Application Data

(60) Provisional application No. 63/365,703, filed on Jun. 1, 2022.

(51) Int. Cl.

| | |
|---|---|
| ***H01R 13/52*** | (2006.01) |
| ***H01R 13/512*** | (2006.01) |
| ***H01R 13/58*** | (2006.01) |
| ***H01R 13/59*** | (2006.01) |
| ***H01R 13/6592*** | (2011.01) |

(52) U.S. Cl.

CPC ....... *H01R 13/5202* (2013.01); *H01R 13/512* (2013.01); *H01R 13/5845* (2013.01); *H01R 13/59* (2013.01); *H01R 13/6592* (2013.01)

(58) Field of Classification Search

None

See application file for complete search history.

(56) References Cited

U.S. PATENT DOCUMENTS

| | | | | |
|---|---|---|---|---|
| 6,142,805 A * | 11/2000 | Gray | H01R 13/5213 439/272 |
| 2014/0051275 A1* | 2/2014 | Thomas | H01R 13/52 439/271 |
| 2018/0323534 A1* | 11/2018 | Patton | H01R 13/5202 |
| 2023/0352873 A1* | 11/2023 | Beshoory | H01R 13/523 |

* cited by examiner

*Primary Examiner* — Oscar C Jimenez

(74) *Attorney, Agent, or Firm* — Robinson + Cole LLP

(57) ABSTRACT

An electrical backshell that includes a strain relief having a flexible neck connected to a jacketed data cable proximate a terminal end of the data cable, and a cylindrical portion integral with said flexible neck; a base connector configured to accept and accommodate the terminal end of the data cable; a coupling nut configured to connect with said base connector and to engage said strain relief and to bring said cylindrical portion of said strain relief into sealing engagement with said base connector, wherein when assembled, said electrical backshell provides waterproof protection for electrical connectors in underground utility meter boxes.

5 Claims, 5 Drawing Sheets

WATERTIGHT ELECTRICAL BACKSHELL FOR SEALING ELECTRICAL CONNECTORS IN AN UNDERGROUND UTILITY METER BOX

CROSS REFERENCES TO RELATED APPLICATIONS

The present application claims the benefit of U.S. Provisional patent application Ser. No. 63/365,703, filed Jun. 1, 2022 (Jun. 1, 2022), which application is incorporated in its entirety by reference herein.

BACKGROUND OF THE INVENTION

Field of the Invention

The present invention relates most generally to systems and apparatus for sealing electrical connectors, and more particularly to sealing underground electrical connectors, and still more particularly to a backshell for sealing an electrical connector for underground smart utility meters having an integrated telemetry (communication) module for the transmission of system data to a remote IT system.

Background Discussion

Underground smart utility meters now routinely include in-ground electronics and communication modules for capturing and transmitting data via regarding utility use to a remote IT system via the internet. The communication modules are co-located in the meter box and are coupled to the meter with a cable, frequently a coaxial cable (coax) or other shielded conductor specifically adapted for the transmission of data. Meter locations or ground conditions often mean that the meter box is subject to pressures (e.g., from heavy equipment passing over the box) to ground movement itself. Further, underground meter boxes may be subject to water exposure from heavy rain, flooding rising water tables, or even simply irrigation. Because electronic connections are exquisitely vulnerable to movement and water exposure, there is a need for a robust and entirely reliable watertight connection between smart utility meter telemetry devices and the meter itself. The present invention is directed to this need, and enables either OEM or retrofit vendors to provide a waterproof connection in an otherwise unsealed connector.

SUMMARY OF THE INVENTION

In its most essential aspect, the present invention is an electrical backshell that includes a strain relief having a flexible neck connected to a jacketed data cable proximate a terminal end of the data cable. The flexible neck expands into an integral cylindrical portion integral. The strain relief engages a base connector configured to accept and accommodate the terminal end of the data cable. Then, a coupling nut configured to connect with the base connector engages both the strain relief and the base connector to bring the cylindrical portion of the strain relief into sealing engagement with the base connector. When the coupling nut is tightened, the backshell provides waterproof protection for electrical connectors in underground utility meter boxes.

BRIEF DESCRIPTION OF SEVERAL VIEWS OF THE DRAWINGS

The invention will be understood and its various objects and advantages will be apparent when consideration is given to the following detailed description thereof. Such description makes reference to the annexed drawings wherein.

DETAILED DESCRIPTION OF THE INVENTION

Figure 1:
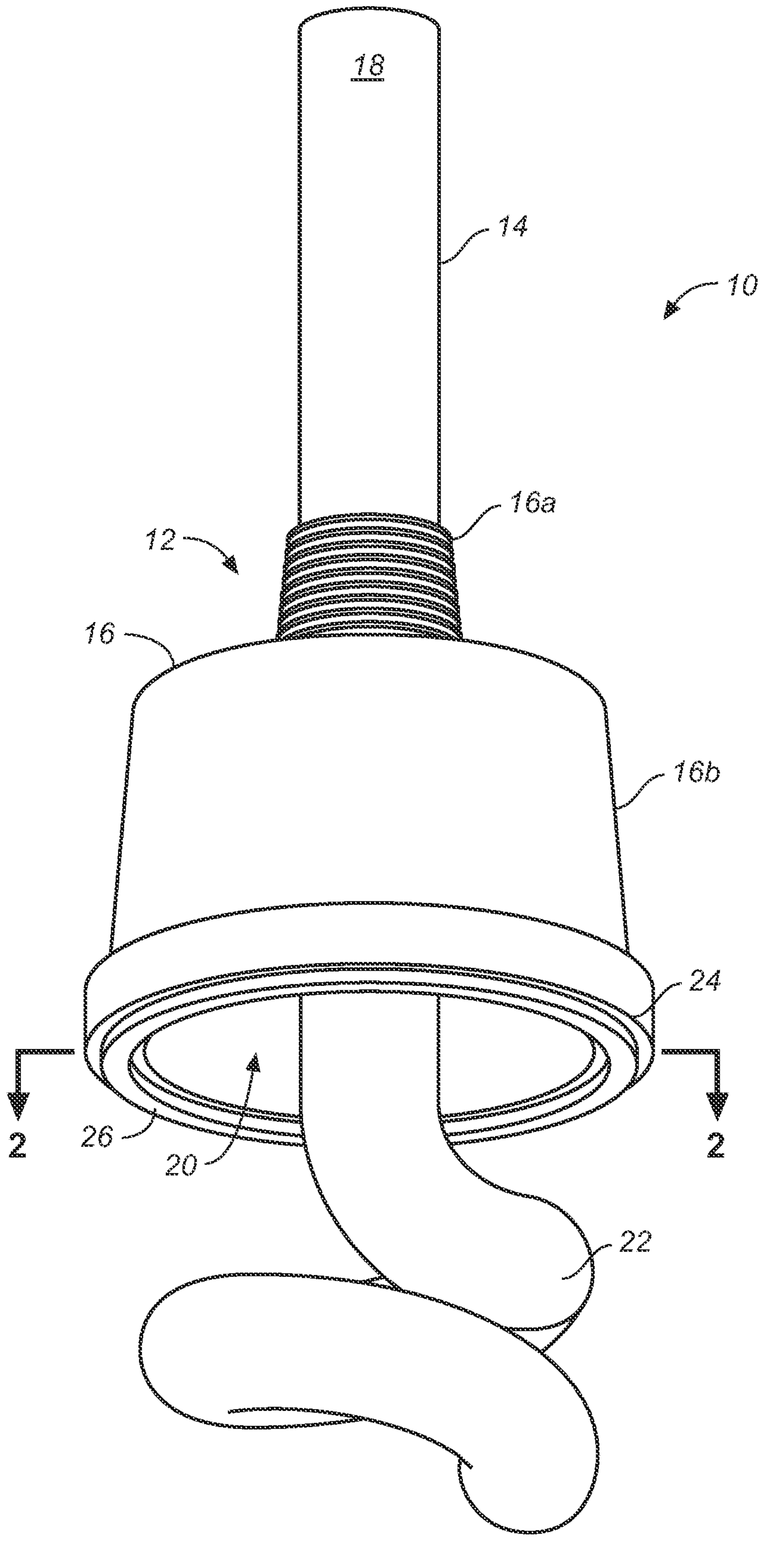
FIG. 1 is a perspective view of the inventive elements included in the waterproofing method for an electrical connector.
Figure 2:
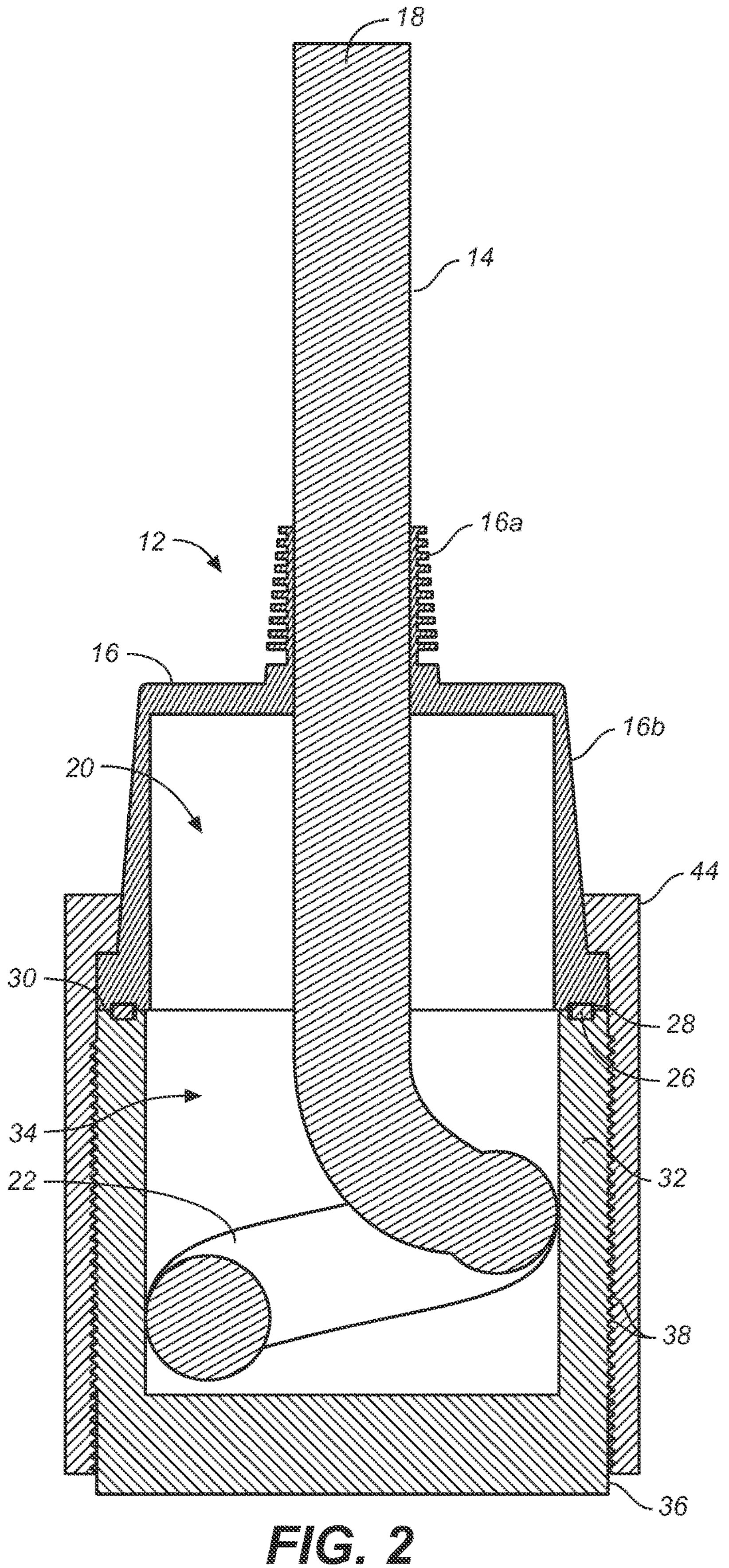
FIG. 2 is a cross-sectional side view in elevation taken along section line 2-2 of FIG. 1, showing the connector attached to a threaded PCB-mounted base connector using a coupling nut.
Figure 3:
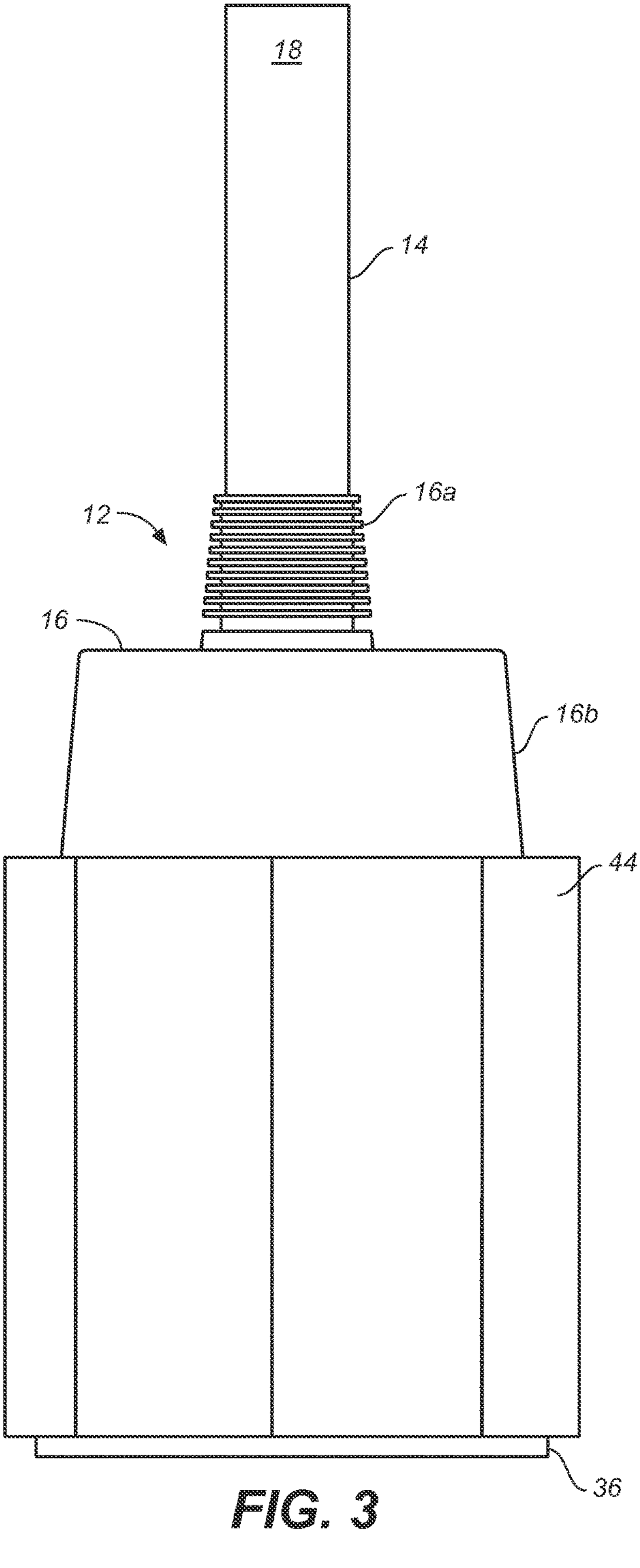
FIG. 3 is a side view in elevation thereof.
Figure 4:
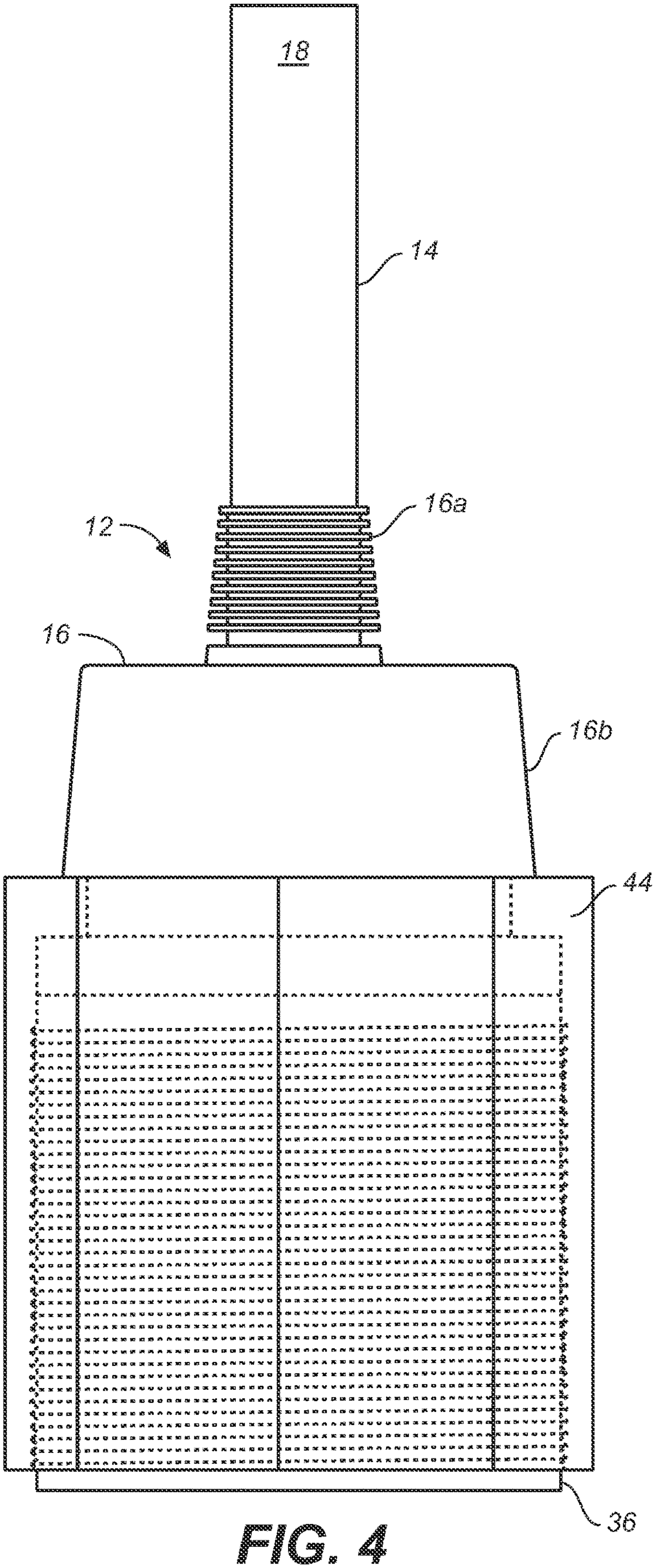
FIG. 4 is the same view with the coupling nut rendered transparent to feature the connecting threads.
Figure 5:
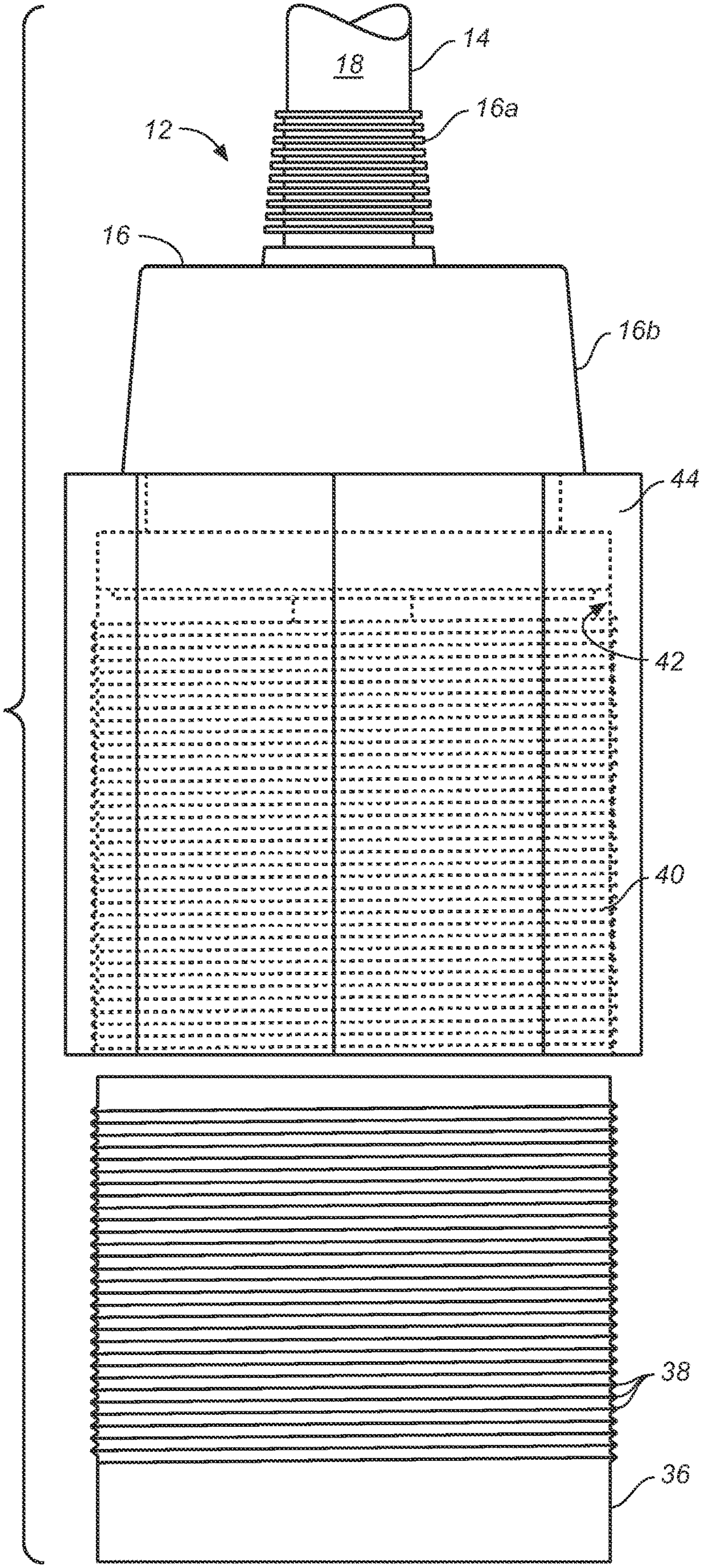
FIG. 5 is an exploded view thereof.

Referring to FIGS. 1 through 5, wherein like reference numerals refer to like components in the various views, there is illustrated therein a new and improved method to waterproof underground electrical connector for smart utility meters, generally denominated 10 herein. Collectively, the views show that the inventive backshell is disposed on the terminal portion 12 of a data cable 14, e.g., a coaxial cable, and includes a strain relief 16 having a flexible ribbed neck or collar **16*a* integrally molded onto the insulative outer jacket 18 of the coaxial cable, and an integral expanded bell or tapered cylindrical portion 16*b* defining an interior cavity or space 20 that can accommodate a straight or coiled portion 22** of the coaxial cable (the latter, if one exists or is formed when connecting the cable). As is known, to introduce a bend in a coaxial cable, the cable is manufactured with a spiral shield on the center conductor. A small turn enables attachment to a threaded connector, the need for which is obviated with a push-on connector.

When so integrally molded, the collar essentially expands into a cylindrical enclosure that constitutes a material continuation of the cable jacket. Thus, a first potential leak path is entirely eliminated.

A planar distal face 24 on the strain relief includes a resilient member configured to seat onto a base connector. In embodiments, the resilient member is an integral resilient O-ring 26, which seats on and in a groove 28 on the outer edge 30 of a PCB-mounted threaded base connector 32, which in embodiments is a PCB-mounted threaded base connector. The base connector also defines an interior space 34 or cavity capable of accommodating the coiled portion of the coaxial cable and unprotected (i.e., non-waterproof) connector. The cylindrical exterior side 36 of has male threads 38 complementary to the female threads 40 on the interior wall 42 of a coupling nut 44, which when screwed onto the base connector compresses the O-ring to provide a complete watertight seal. Because the strain relief is directly molded to the coaxial (or other) cable outer jacket, there is no leak path on the cable side of the connection. Thus, a second potential leak path is entirely eliminated, and when the backshell is viewed in its entirety, there is no leak path at any point in the electrical connector structure.

In embodiments, the O-ring 26 may be molded into the outer edge 30 of the PCB-mounted threaded base connector 32, and the strain relief distal face 24 may be configured with a groove to accommodate the O-ring on assembly.

As will be readily appreciated by those with skill in the art, a connector with sufficient dimensions may accommodate SSMB, SMB, SMA, and F cables and connectors.

The inventive connector improves reliability in rugged field applications, such as harsh meter pit or underwater applications. They have been shown in field tests to maintain a watertight seal up to 30 meters under water.

The above disclosure is sufficient to enable one of ordinary skill in the art to practice the invention and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A waterproof underground electrical connector configured for a sealing connection on a terminal portion of a data cable having an outer insulative jacket, wherein said data cable is a coaxial cable, comprising:

a strain relief directly and integrally molded onto the outer jacked of the coaxial cable having a flexible neck and an integral cylindrical portion defining an interior cavity that accommodates a nonlinear coiled portion of the coaxial cable having a spiral shield on its center conductor, wherein said cylindrical portion includes a planar distal face with a resilient member configured to seat onto and into a groove on an outer edge of a cylindrical base connector;

said integral cylindrical portion of said strain relief has a tapered outer surface and a receiving lip projecting away from said interior cavity;

a cylindrical base connector defining a bounded and sealed interior space aligned with said interior cavity and sized to accommodate said nonlinear coiled portion of said coaxial cable, said cylindrical base connector having a male threaded coupling structure disposed on an exterior side; and a cylindrical coupling nut having a projecting lip and an interior wall with a female threaded coupling structure complementary to said male threaded coupling structure disposed on said exterior side of said base connector, such that when said cylindrical base connector and said cylindrical coupling nut are threadably mated for connection, said coupling nut compresses said receiving lip of said strain relief to said projecting lip of said cylindrical coupling nut and said resilient member to said cylindrical base connector to provide a watertight seal that fully bounds and encloses said terminal portion of said data cable in said interior cavity and said bounded interior space without an electrical connection to accommodate said nonlinear coiled portion of said coaxial cable in a water tight seal to provide a waterproof protection for said terminal portion of said electrical connector in an underground utility meter box.

2. The electrical connector of claim 1, wherein said resilient member is an O-ring.

3. The electrical connector of claim 2, wherein said O-ring is integrally formed in said planar distal face.

4. The electrical connector of claim 1, wherein said flexible neck of said strain relief includes ribs.

5. A waterproof underground electrical connector configured for a sealing connection on the terminal portion of a data cable having an outer insulative jacket, comprising:

a strain relief directly and integrally molded onto an outer jacket of the data cable having a flexible neck and an integral cylindrical portion defining an interior cavity that accommodates a nonlinear coiled portion of the data cable having a shield on its center conductor, wherein said cylindrical portion includes a planar distal face with a resilient member configured to seat onto and into a groove on an outer edge of a cylindrical base connector;

said integral cylindrical portion of said strain relief has a tapered outer surface and a receiving lip projecting away from said interior cavity;

a cylindrical base connector defining a bounded and sealed interior space aligned with said interior cavity and sized to accommodate said nonlinear coiled portion of said data cable, said cylindrical base connector having a male threaded coupling structure disposed on an exterior side; and a cylindrical coupling nut having a projecting lip and an interior wall with a female threaded coupling structure complementary to said male threaded coupling structure disposed on said exterior side of said base connector, such that when said cylindrical base connector and said cylindrical coupling nut are threadably mated for connection, said coupling nut compresses said receiving lip of said strain relief to said projecting lip of said cylindrical coupling nut and said resilient member to said cylindrical base connector to provide a watertight seal that fully bounds and encloses said terminal portion of said data cable in said interior cavity and said bounded interior space without an electrical connection to accommodate said nonlinear coiled portion of said data cable in a water tight seal to provide a waterproof protection for said terminal portion of said electrical connector in an underground utility meter box.

* * * * *